United States Patent
Fischer

(10) Patent No.: US 10,558,343 B1
(45) Date of Patent: Feb. 11, 2020

(54) INTERACTION PLANE ROTATION FOR MANIPULATION OF THREE-DIMENSIONAL OBJECTS

(71) Applicant: Adobe Inc., San Jose, CA (US)

(72) Inventor: Alex John Fischer, San Francisco, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/192,550

(22) Filed: Nov. 15, 2018

(51) Int. Cl.
| | |
|---|---|
| *G06F 3/0481* | (2013.01) |
| *G06T 15/20* | (2011.01) |
| *G06T 19/00* | (2011.01) |
| *G06F 3/0484* | (2013.01) |
| *G06T 19/20* | (2011.01) |

(52) U.S. Cl.
CPC ...... *G06F 3/04845* (2013.01); *G06F 3/04815* (2013.01); *G06T 19/20* (2013.01)

(58) Field of Classification Search
CPC ........... A63F 13/525; A63F 2300/6661; G06F 3/048; G06F 3/04815; G06F 17/50; G06T 15/20; G06T 19/00; G06T 19/003; G06T 15/00; G06T 17/00
See application file for complete search history.

(56) References Cited

U.S. PATENT DOCUMENTS

2012/0314030 A1* 12/2012 Datta .................. H04N 13/264 348/44
2013/0176384 A1* 7/2013 Jones ................. H04N 5/23238 348/36

* cited by examiner

*Primary Examiner* — Ke Xiao
*Assistant Examiner* — Andrew Shin
(74) *Attorney, Agent, or Firm* — SBMC

(57) ABSTRACT

Systems and techniques are described for interaction plane rotation for manipulation of three-dimensional objects. A three-dimensional object can be displayed as a two-dimensional representation of the object, represented on an interaction plane and intersected by an object view vector that represents a point of view of the object through a viewing plane. An angle between the object view vector and the interaction plane is calculated and compared to a threshold value. A determination is made that the calculated angle is less than the threshold value, and a rotation magnitude that defines an amount of rotation of the interaction plane relative to a constant vector is calculated. The interaction plane is rotated relative to the constant vector in a rotation direction by the rotation magnitude. The rotated interaction plane can then be used to determine an intended relative movement between the object view vector and the three-dimensional object.

20 Claims, 9 Drawing Sheets

INTERACTION PLANE ROTATION FOR MANIPULATION OF THREE-DIMENSIONAL OBJECTS

BACKGROUND

Computing devices render a three-dimensional object in a three-dimensional space by projecting the three-dimensional object in the three-dimensional space on a two-dimensional display of a display device. In other words, a two-dimensional representation of the three-dimensional object in the three-dimensional space is displayed on the display of the display device. The two-dimensional representation of the three-dimensional object is viewed on the display of the display device from a point of view that can move within the three-dimensional space. This point of view is defined by an object view vector. For example, the user may adjust the point of view (object view vector) to examine the three-dimensional object from different perspectives without moving the three-dimensional object within the three-dimensional space. Movements of the object view vector in the three-dimensional space are observed by the user as changes in the two-dimensional representation of the three-dimensional object on the display.

The three-dimensional object can also be moved and manipulated in the three-dimensional space. The user's manipulation of the three-dimensional object is limited to two-dimensional movements of a user input, such as with a mouse input device. To reflect these two-dimensional movements, an interaction plane is used to project the user's two-dimensional movements into the three-dimensional space. In this manner, the three-dimensional object in the three-dimensional space is projected on the two-dimensional display where two-dimensional manipulations of the two-dimensional representation of the three-dimensional object are projected into the three-dimensional space by the interaction plane. These movements of the three-dimensional object in the three-dimensional space are also observed by the user as changes in the two-dimensional representation of the three-dimensional object on the display.

Ray casting may be used to determine how a user intends for the three-dimensional object to move in the three-dimensional space based on the user's two-dimensional user inputs. This is accomplished by processing intersection tests between rays and the interaction plane. A ray is cast through a viewing plane and onto the interaction plane when a user begins and ends a two-dimensional manipulation of the three-dimensional object. The difference between the beginning ray and the ending ray on the interaction plane is used to determine how the user intends for the three-dimensional object to move in the three-dimensional space.

Manipulation of a three-dimensional object projected on a two-dimensional display device in accordance with a user's intentions is challenging when an object view vector is aligned, or nearly aligned, with the interaction plane used to project the three-dimensional object in the three-dimensional space. This is challenging because ray cast intersection information is limited when the object view vector is aligned, or nearly aligned, with the interaction plane. In other words, reflecting a user's expectation for relative movements of an object view vector and a three-dimensional object is challenging when an angle between the object view vector and the interaction plane is a small angle. In this situation, a user's attempts to manipulate either the three-dimensional object or the object view vector may result in disproportionally large displacements of the three-dimensional object relative to the object view vector, or the object view vector relative to the three-dimensional object. Also, in this situation, the user's attempts to manipulate either the three-dimensional object or the object view vector may result in disproportionally small displacements, or no displacement, of the three-dimensional object relative to the object view vector or the object view vector relative to the three-dimensional object.

SUMMARY

Systems and techniques are described for interaction plane rotation for manipulation of three-dimensional objects. In one example, a determination is made as to whether a relative movement between an object view vector and a three-dimensional object is in one axis or in two axes. Based on this determination, a threshold value is determined for relative movement in one axis or relative movement in two axes. With the threshold value determined, an angle between the object view vector and an interaction plane is calculated and compared to the threshold value. A determination can be made that the calculated angle between the object view vector and the interaction plane is less than the threshold value. The interaction plane is then rotated about a constant vector to increase the angle between the object view vector and the interaction plane. By increasing the angle between the object view vector and the interaction plane, ray cast intersection information is no longer limited and a user's intention for relative movements of an object view vector and a three-dimensional object is determined.

The rotation of the interaction plane about the constant vector is performed by calculating a rotation magnitude defining an amount of rotation of the interaction plane relative to the constant vector. The rotation magnitude may be proportional to the angle between the object view vector and the interaction plane. A rotation direction defining a direction of rotation of the interaction plane relative to the constant vector is also determined. Finally, the interaction plane is rotated about the constant vector in the rotation direction by the rotation magnitude. In this manner, the rotated interaction plane is used for ray cast intersection tests and the user's intention for relative movements of the object view vector and a three-dimensional object is determined. As a result, a two-dimensional projection of the three-dimensional object can be manipulated in accordance with the user's intentions.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
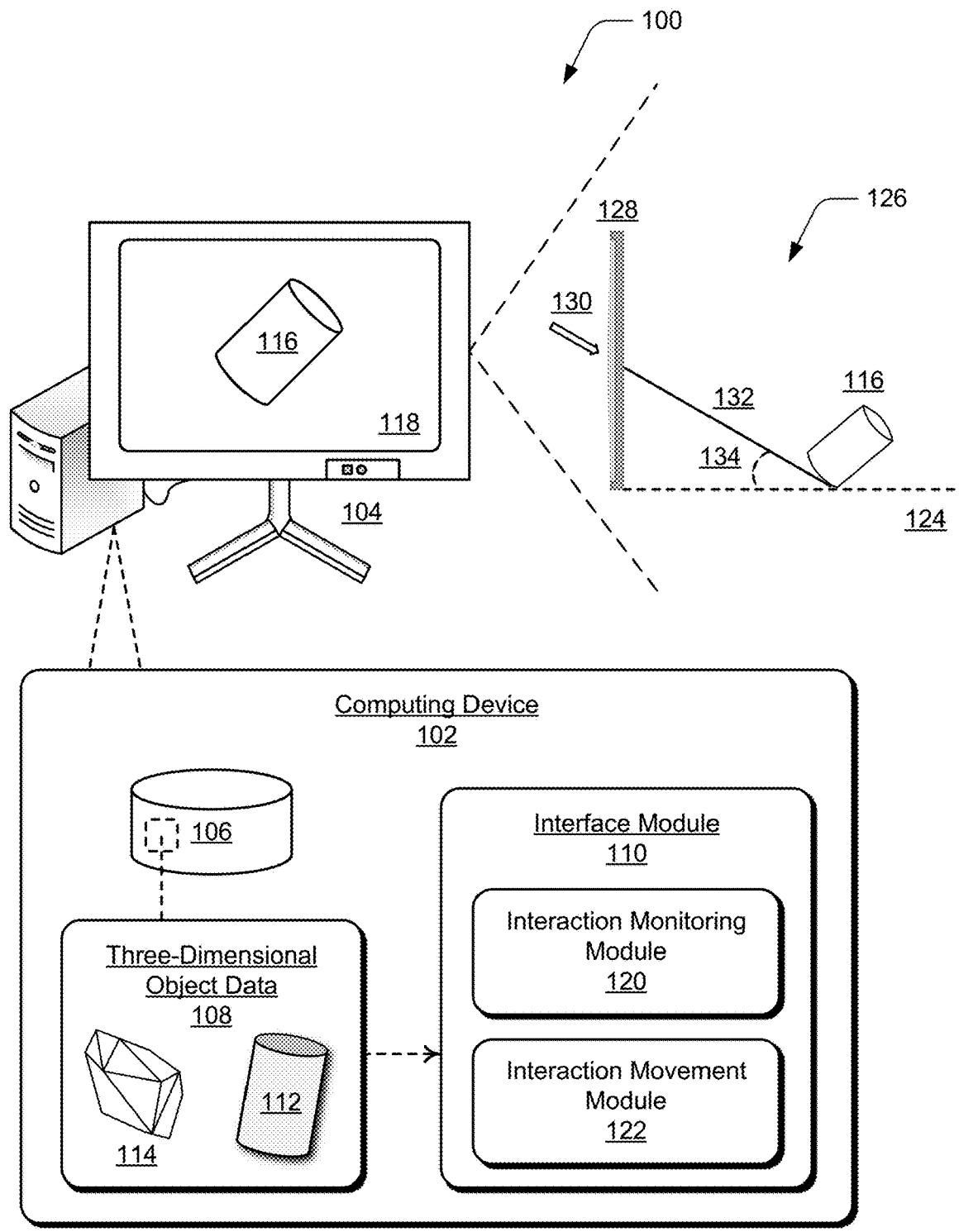
FIG. 1 is an illustration of an environment in an example implementation that is operable to employ digital systems and techniques as described herein.

Implementations of interaction plane rotation for manipulation of three-dimensional objects are described, and provide for user manipulation of a two-dimensional representation of a three-dimensional object that is displayed on a display device. Manipulation of the three-dimensional object projected on a two-dimensional display device in accordance with user inputs to manipulate the three-dimensional object is challenging when an object view vector is aligned, or nearly aligned, with an interaction plane used to project the three-dimensional object in the represented three-dimensional space. This is challenging because ray cast intersection information is limited when the object view vector is aligned, or nearly aligned, with the interaction plane. For example, when an angle between an object view vector and an interaction plane is small, a user input to manipulate a display of the three-dimensional object and produce a small relative movement between the object view vector and a three-dimensional object may result in a large relative movement between the object view vector and the three-dimensional object. Additionally, when an angle between an object view vector and an interaction plane is a small angle, a user input to manipulate the display of the three-dimensional object and produce a large relative movement between the object view vector and a three-dimensional object may result in a small relative movement, or no movement at all, between the object view vector and the three-dimensional object.

Accordingly, systems and techniques are described for interaction plane rotation for manipulation of three-dimensional objects. In one example, a determination is made as to whether a relative movement between an object view vector and a three-dimensional object is in one axis or in two axes. Based on this determination, a threshold value is determined for relative movement in one axis or relative movement in two axes. For example, a relative movement in one axis may have a lower threshold than a relative movement in two axes. This is because the limited ray cast intersection information is less challenging to overcome when the relative movement is in one axis than when the relative movement is in two axes.

An angle between the object view vector and an interaction plane can be calculated and compared to the determined threshold value. Another determination is made that the calculated angle between the object view vector and the interaction plane is less than the threshold value. This determination indicates that information from ray intersection tests will be limited and movements of the three-dimensional object in a represented three-dimensional space will be unpredictable. In response, the interaction plane can then be rotated about a constant vector to increase the angle between the object view vector and the interaction plane. By increasing the angle between the object view vector and the interaction plane, ray cast intersection information is no longer limited and the ray cast intersection information can be used in response to user inputs to initiate relative movements of the three-dimensional object with reference to the object view vector.

A rotation magnitude can be calculated defining an amount of rotation of the interaction plane relative to the constant vector based on the calculated angle between the object view vector and the interaction plane being less than the threshold value. The rotation magnitude may be proportional to the calculated angle between the object view vector and the interaction plane. The rotation magnitude can be calculated by mapping the calculated angle between the object view vector and the interaction plane to a magnitude range. For example, a calculated angle between the object view vector and the interaction plane may be in a range of 0.0 to 0.1 radians, and the calculated angle between the object view vector and the interaction plane may be mapped to a magnitude in a range of 0.0 to $\pi/4$ radians to calculate the rotation magnitude.

A rotation direction of the interaction plane can also be determined by defining a direction of rotation of the interaction plane relative to the constant vector such that rotating the interaction plane relative to the constant vector will increase the angle between the object view vector and the interaction plane. The rotation direction can be determined by calculating a dot product between the object view vector and the constant vector. The constant rotation axis vector can be determined by calculating the cross product of the object view vector and the default interaction plane's normal vector.

Finally, the interaction plane can then be rotated relative to the constant vector in the rotation direction by the rotation magnitude. In this manner, the rotated interaction plane can be used for ray cast intersection tests and the relative movements of the object view vector and the three-dimensional object may be determined. As a result, a two-dimensional projection of the three-dimensional object can be manipulated in accordance with the user inputs to manipulate the display of the three-dimensional object in the three-dimensional space.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ techniques for interaction plane rotation for manipulation of three-dimensional objects, as described herein. The illustrated environment 100 includes a computing device 102 and a display device 104 that are communicatively coupled via a wired or a wireless connection. A variety of computing device configurations may be used to implement the computing device 102 and/or the display device 104. The computing device 102, for instance, may be configured as a desktop computer, a laptop computer, a mobile device, and so forth. Thus, the computing device 102 may range from a full resource device with substantial memory and processor resources (e.g., a personal computer, a game console) to a low-resource device with limited memory and/or processing resources (e.g., a mobile device). Additionally, although a single computing device 102 is shown, the computing device may be representative of multiple, different devices, such as multiple servers utilized by a business to perform operations on-line or "over the cloud."

The computing device 102 includes a storage device 106 which is illustrated to include three-dimensional object data 108. The three-dimensional object data 108 is an input to an interface module 110 of the computing device 102. In this example, the three-dimensional object data 108 includes a three-dimensional object 112 and another three-dimensional object 114. The interface module 110 may be implemented partially in hardware of the computing device 102 to process and render the three-dimensional object 112 as a two-dimensional representation 116 of the three-dimensional object 112 in a user interface 118 for output, e.g., by the display device 104. Although illustrated as implemented locally at the computing device 102, functionality of the interface module 110 may be also be implemented in whole or in part via functionality available via a network, such as part of a web service of one or more server computing devices "in the cloud."

The interface module 110 is illustrated to include an interaction monitoring module 120 and an interaction movement module 122. In this example, the interaction monitoring module 120 may be implemented partially in hardware of the computing device 102 to monitor user interaction with the two-dimensional representation 116 of the three-dimensional object 112 in the user interface 118. The interaction movement module 122 may also be implemented partially in the hardware of the computing device 102 to facilitate user interaction with the two-dimensional representation 116 of the three-dimensional object 112 in the user interface 118. Although illustrated as implemented locally at the computing device 102, functionality of the interaction monitoring module 120 and/or the interaction movement module 122 may also be implemented in whole or in part via functionality available via a network, such as part of the web service or "in the cloud."

The interface module 110 uses an interaction plane 124 to project the three-dimensional object 112 in a three-dimensional space 126 which is represented by the two-dimensional representation 116 of the three-dimensional object 112 through a view plane 128. A user views the two-dimensional representation 116 of the three-dimensional object 112 according to a point of view 130 through the view plane 128 and defined by an object view vector 132 in the three-dimensional space 126. In this example, the object view vector 132 intersects the interaction plane 124 at an angle 134. If the object view vector 132 is aligned, or nearly aligned, with the interaction plane 124, then ray cast intersection information becomes limited. In other words, when the angle 134 between the object view vector 132 and the interaction plane 124 is a small angle, limited ray cast intersection information is available to project the two-dimensional representation 116 of the three dimensional object 112.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

FIGS. 2A-D depict examples of manipulations of the three-dimensional object 114 in an example digital environment. In these examples, a two-dimensional representation 200 of the three-dimensional object 114 is shown as rendered in the user interface 118. For example, the interface module 110 implemented by the computing device 102 can process the three-dimensional object 114 and render the two-dimensional representation 200 in the user interface 118. A user may interact with the two-dimensional representation 200 via a user input 202, such as with a cursor control device, gesture, spoken utterance, and so forth.

Figure 2A:
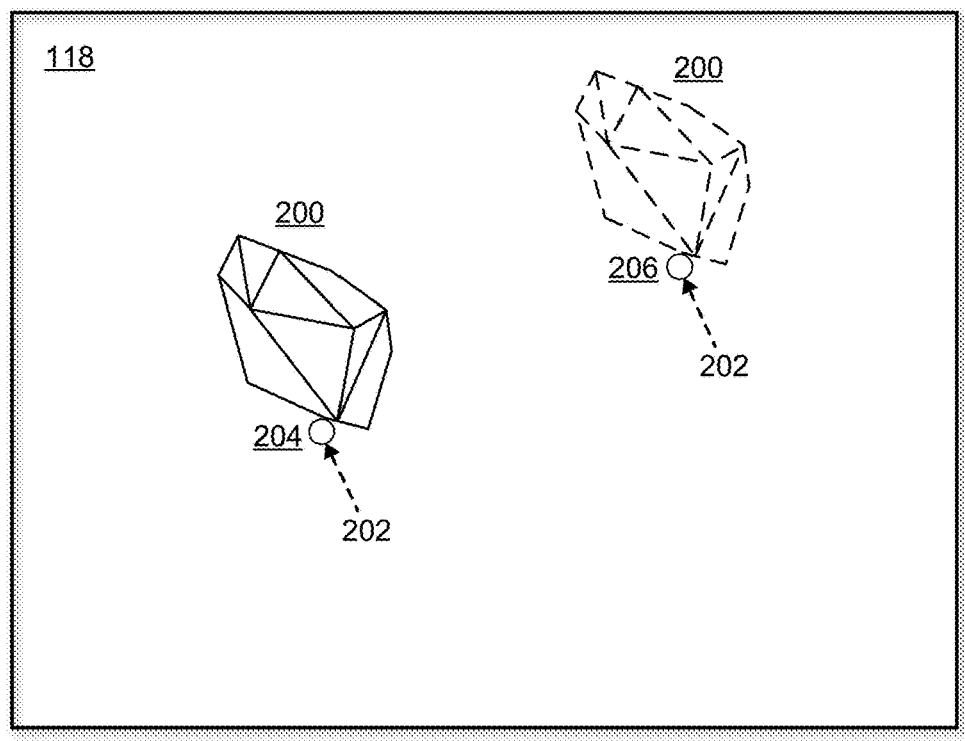
FIGS. 2A, 2B, 2C, and 2D depict examples of manipulations of a three-dimensional object in an example environment.

FIG. 2A depicts a user interaction with the two-dimensional representation 200 when the angle 134 between the object view vector 132 and the interaction plane 124 is a large angle, e.g., as relative to a small angle. Initially, the user input 202 is in a first position 204 and a user attempts to move the two-dimensional representation 200 by moving the user input 202 to a second position 206. As shown in FIG. 2A, the two-dimensional representation 200 of the three-dimensional object 114 moves as the user intends. Here, the two-dimensional representation 200 of the object moves to an expected position because the angle 134 between the object view vector 132 and the interaction plane 124 is a large angle.

Figure 2B:
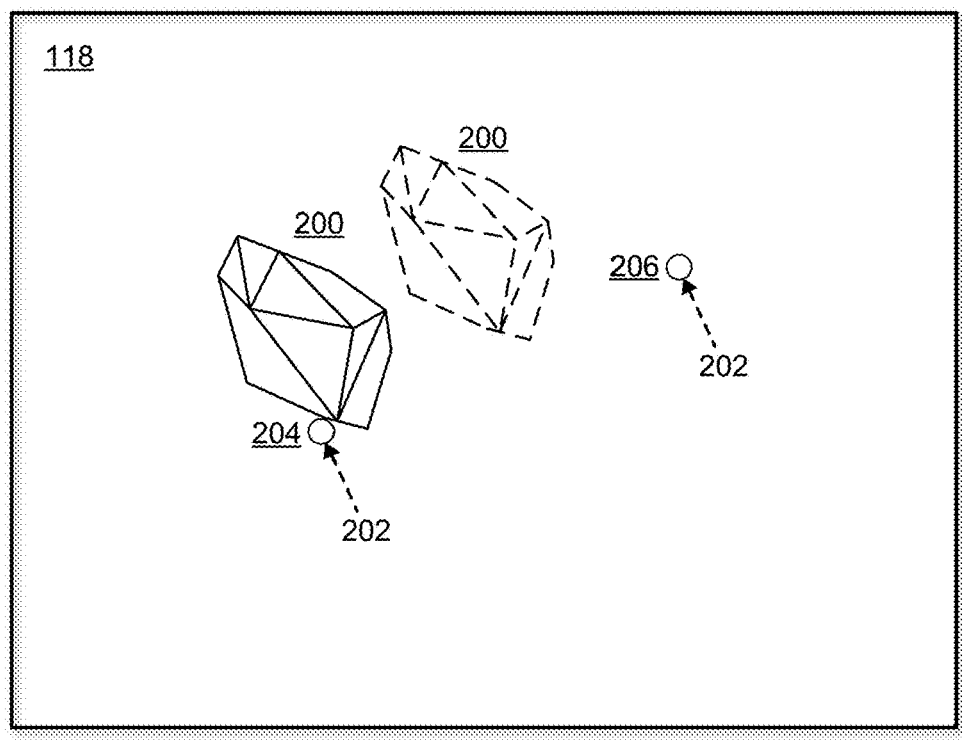

FIG. 2B depicts a user interaction with the two-dimensional representation 200 of the three-dimensional object 114 when the angle 134 between the object view vector 132 and the interaction plane 124 is a small angle, e.g., as relative to a large angle. Again, the user input is initially in the first position 204 and the user attempts to move the two-dimensional representation 200 of the three-dimensional object 114 by moving the user input 202 to the second position 206. As shown in FIG. 2B, the two-dimensional representation 200 of the object does not move as the user intends. Instead, the two-dimensional representation 200 of the object moves to an unexpected position because the angle 134 between the object view vector 132 and the interaction plane 124 is small, and ray cast intersection information to determine the user's input 202 is limited.

Figure 2C:
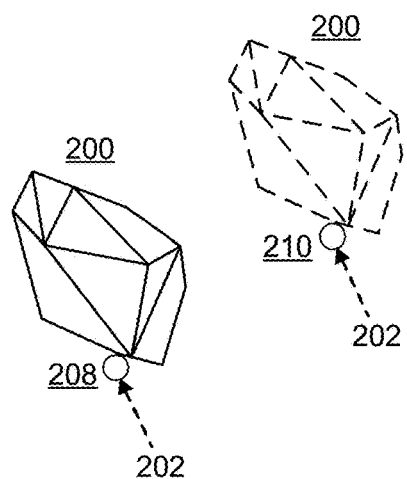

FIG. 2C depicts another user interaction with the two-dimensional representation 200 of the three-dimensional object 114 when the angle 134 between the object view vector 132 and the interaction plane 124 is a large angle. Initially, the user input 202 is in a first position 208 and the user attempts to move the two-dimensional representation 200 of the three-dimensional object 114 by moving the user input 202 to a second position 210. As shown in FIG. 2C, the two-dimensional representation 200 of the object moves as the user intends. Here, the two-dimensional representation 200 of the object moves to an expected position because the angle 134 between the object view vector 132 and the interaction plane 124 is large, and ray cast intersection information is available to determine the user's input 202.

Figure 2D:
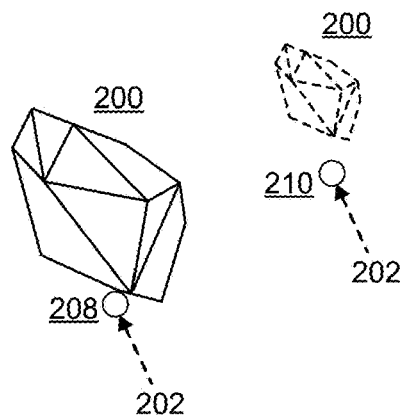

FIG. 2D depicts another user interaction with the two-dimensional representation 200 of the three-dimensional object 114 when the angle 134 between the object view vector 132 and the interaction plane 124 is a small angle. Again, the user input is initially in the first position 208 and the user attempts to move the two-dimensional representation 200 of the three-dimensional object 114 by moving the user input 202 to the second position 210. As shown in FIG. 2D, the two-dimensional representation 200 of the object does not move as the user intends. Instead, the two-dimensional representation 200 of the object moves to an unexpected position because the angle 134 between the object view vector 132 and the interaction plane 124 is small, and ray cast intersection information to determine the user's input 202 is limited.

Interaction Plane Rotation for Manipulation of Three-Dimensional Objects

Figure 3A:
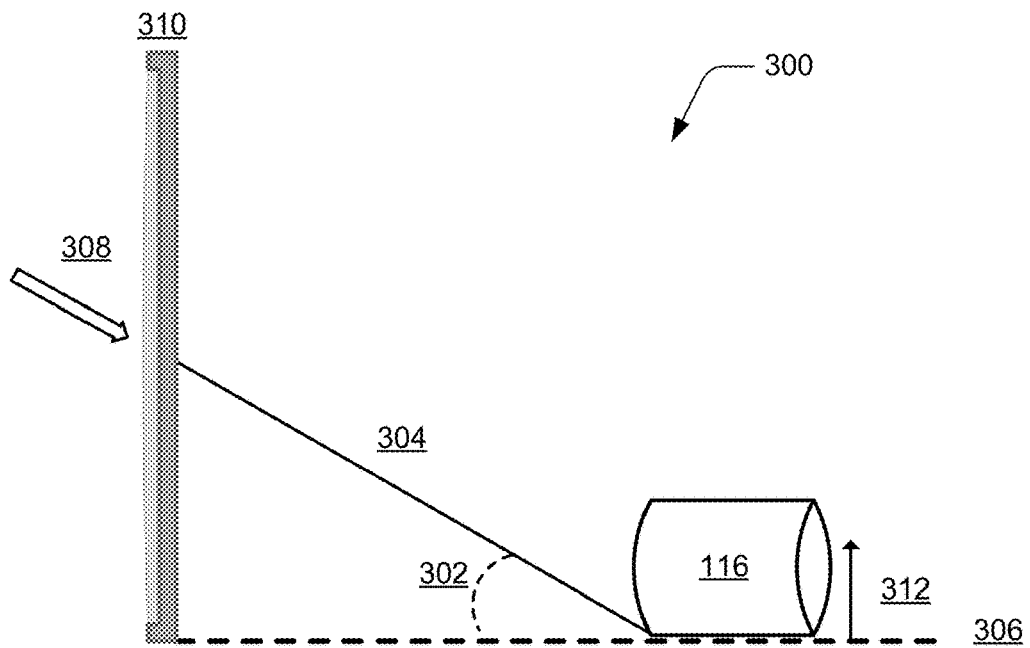
FIGS. 3A, 3B, 3C, and 3D depict examples of an interaction plane rotation.

FIGS. 3A-D depict examples of an interaction plane rotation. FIG. 3A depicts a graphical representation 300 of an angle 302 between an object view vector 304 and an interaction plane 306 in an example environment. In this example, the object view vector 304 defines a user's point of view 308 through a view plane 310. As described above, the user's point of view 308 is adjustable in the example environment, and changes of the user's point of view 308 in the example environment may be displayed in the user interface 118. A constant vector 312 is usable for reference, as perpendicular to the interaction plane 306.

Figure 3B:
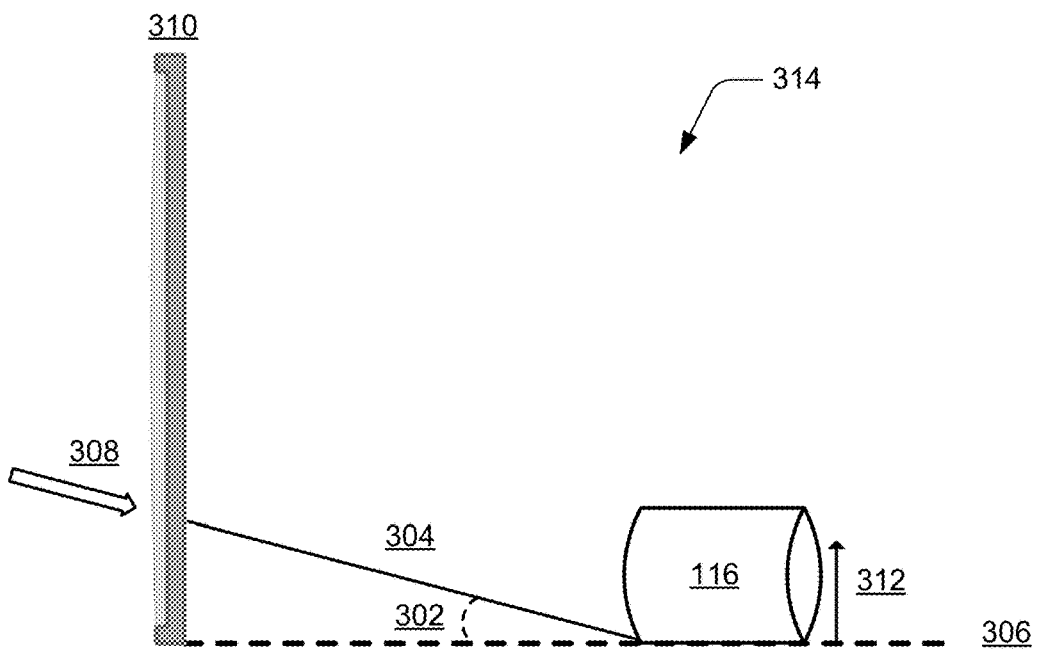

FIG. 3B depicts a graphical representation 314 of a reduced angle 302 between the object view vector 304 and the interaction plane 306 in an example environment. In this example, the user point of view 308 has moved relative to the constant vector 312 causing the angle 302 between the object view vector 304 and the interaction plane 306 to decrease.

Figure 3C:
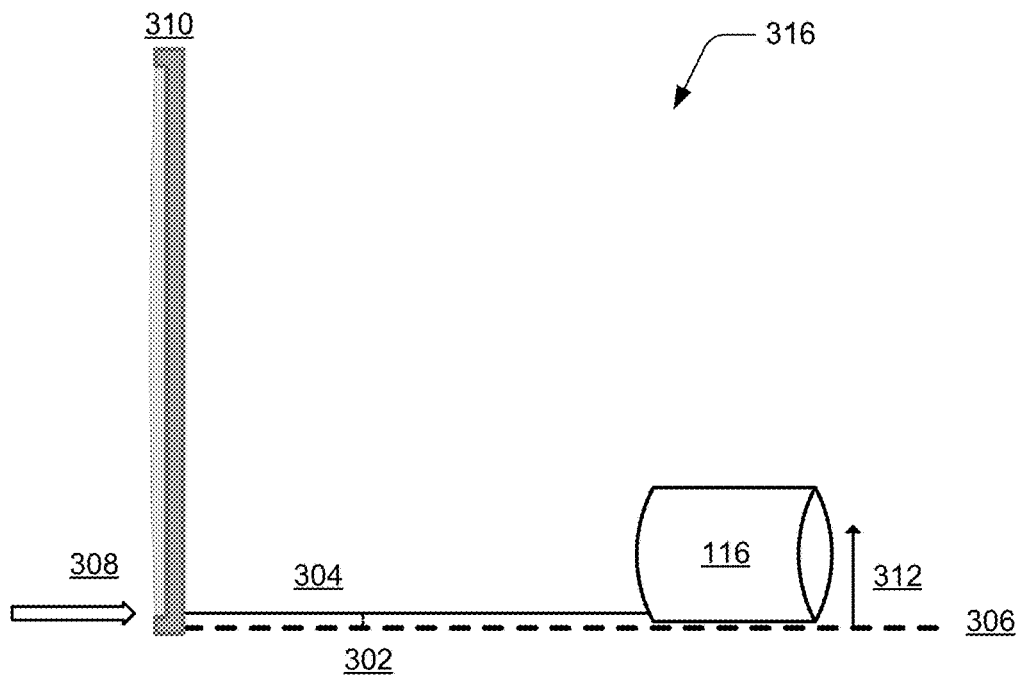

FIG. 3C depicts a graphical representation 316 of a small or zero angle 302 between the object view vector 304 and the interaction plane 306 in an example environment. As shown in FIG. 3C, the object view vector 304 is aligned, or nearly aligned, with the interaction plane 306 and ray cast intersection information to determine user inputs is limited. In this small or zero angle condition, a user's input attempt to move the two-dimensional representation 116 of the three-dimensional object 112 by a relatively small amount may move the two-dimensional representation 116 of the object by a relatively large amount. Also in the small or zero angle condition, a user's input attempt to move the two-dimensional representation 116 of the three-dimensional object 112 by a relatively large amount may move the two-dimensional representation 116 of the object by a relatively small amount or by no amount at all. By way of example, and not limitation, the small angle 302 may be an angle in a range of 0.0 to 0.1 radians. A threshold for the small angle 302 may be determined by a relative movement between the three-dimensional object 112 and the object view vector 304. For example, a relative movement in a single axis may have a smaller threshold than a relative movement in two axes because user inputs can be determined with less ray cast intersection information for movements in a single axis than for movements in two axes.

Figure 3D:
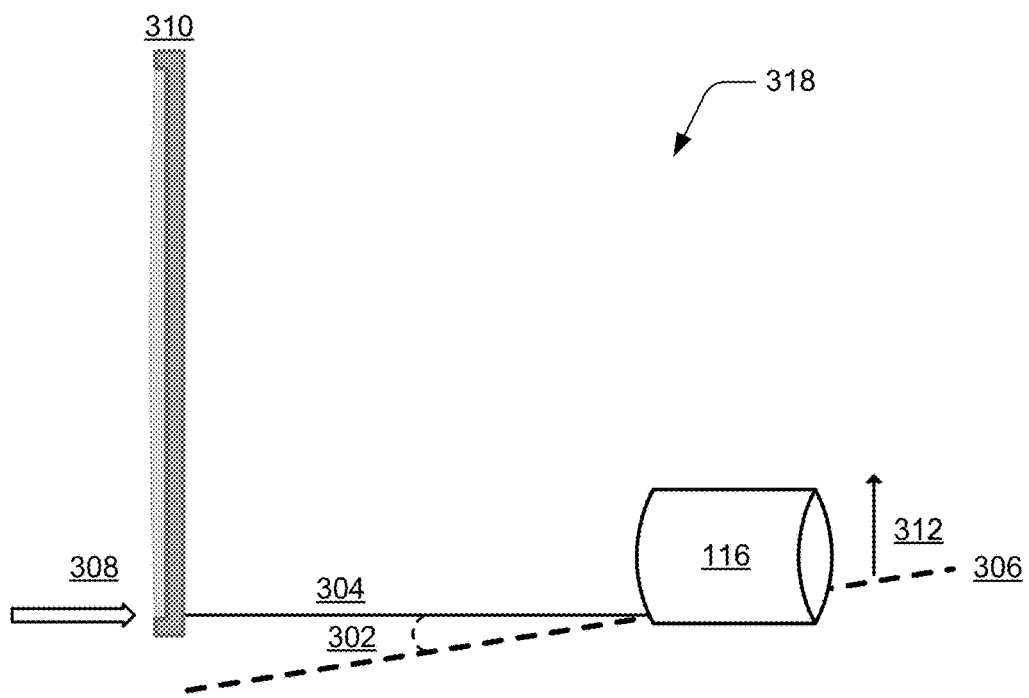

FIG. 3D depicts a graphical representation 318 of a rotated interaction plane 306 to correct for the small or zero angle 302 between an object view vector 304 and an interaction plane 306 in an example environment. In this example, rotating the interaction plane 306 relative to the constant vector 312 has increased the angle 302 between the object view vector 304 and the interaction plane 306 compared to the small or zero angle condition. As shown in FIG. 3D, rotating the interaction plane 306 can pivot the interaction plane 306 about the original interaction point to increase the angle 302. By rotating the interaction plane 306 relative to the constant vector 312, the object view vector 304 is no longer aligned, or nearly aligned, with the interaction plane 306 and ray cast intersection information to determine user inputs is no longer limited. In this manner, a user input attempt to move the two-dimensional representation 116 of the three-dimensional object 112 by a relatively small amount may move the two-dimensional representation 116 of the object by the relatively small amount. Also, a user input attempt to move the two-dimensional representation 116 of the object by a relatively large amount may move the two-dimensional representation 116 of the object by the relatively large amount.

Figure 4A:
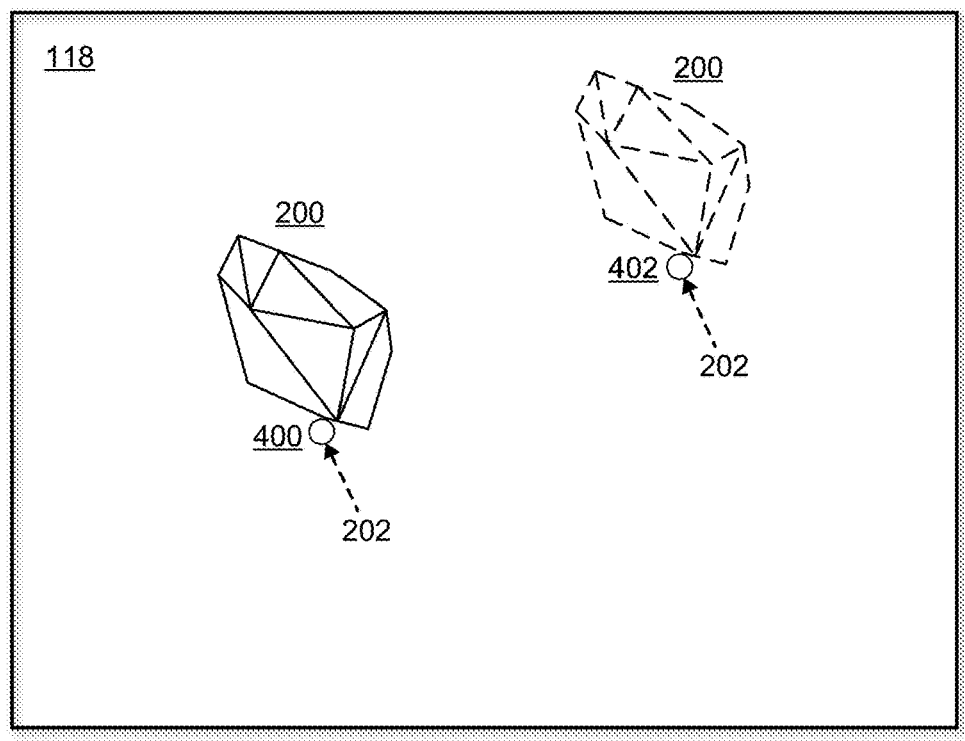
FIGS. 4A, 4B, 4C, and 4D depict examples of manipulations of a three-dimensional object in an example environment with interaction plane rotation.

FIGS. 4A-D depict examples of manipulations of the three-dimensional object 114 in an example environment with interaction plane rotation as shown and described with reference to FIG. 3D. FIG. 4A depicts a user interaction with the two-dimensional representation 200 of the three-dimensional object 114 when the angle 302 between the object view vector 304 and the interaction plane 306 is a large angle. Initially, the user input 202 is in a first position 400 and the user attempts to move the two-dimensional representation 200 of the three-dimensional object 114 by moving the user input 202 to a second position 402. As shown in FIG. 4A, the two-dimensional representation 200 of the object moves as the user intends. Here, the two-dimensional representation 200 moves to an expected position because the angle 302 between the object view vector 304 and the interaction plane 306 is large, and ray cast intersection information is not limited.

Figure 4B:
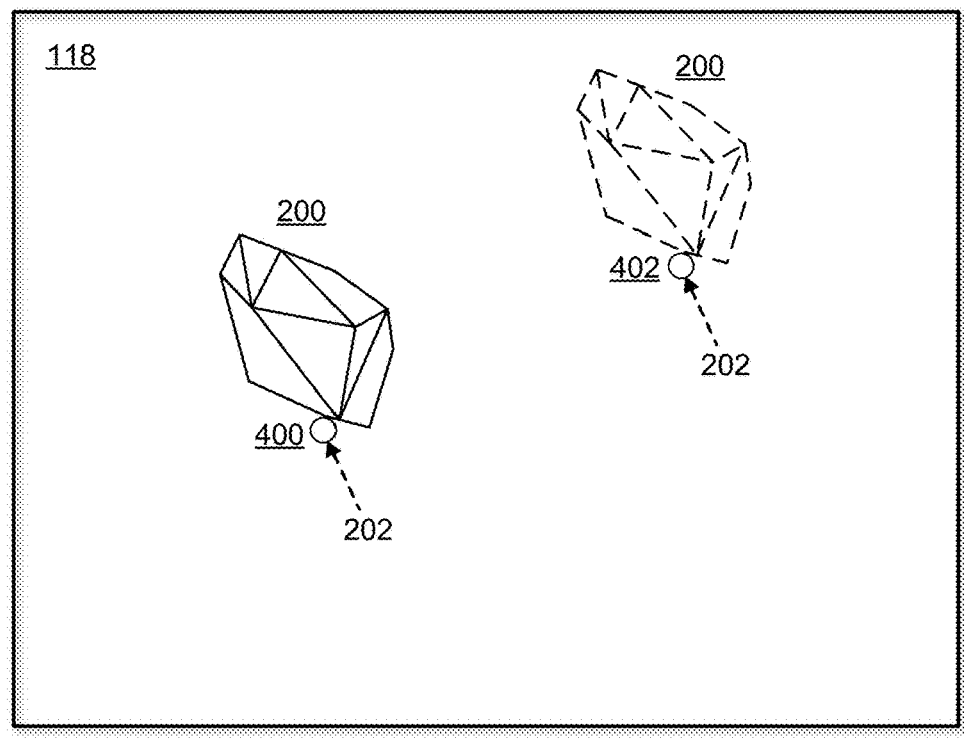

FIG. 4B depicts a user interaction with the two-dimensional representation 200 of the three-dimensional object 114 when the angle 302 between the object view vector 304 and the interaction plane 306 is a small angle, and the interaction plane 306 is rotated about the constant vector 312 to increase the angle 302 and increase the available ray cast intersection information. Again, the user input is initially in the first position 400 and the user attempts to move the two-dimensional representation 200 of the three-dimensional object 114 by moving the user input 202 to the second position 402. As shown in FIG. 4B, the two-dimensional representation 200 of the object now moves as the user intends, with small mouse movements correlating to small movements of the object in the user interface 118. The two-dimensional representation 200 of the object moves to the expected position because the interaction plane 306 is rotated about the constant vector 312 to correct the small angle 302 between the object view vector 304 and the interaction plane 306. Although the two-dimensional representation 200 may not be exactly under the user input 202 in the second position 402 because the rotated interaction plane 306 is used for ray cast intersection tests, the two-dimensional representation 200 moves as the user intends and unexpected movements of the two-dimensional representation are prevented.

Figure 4C:
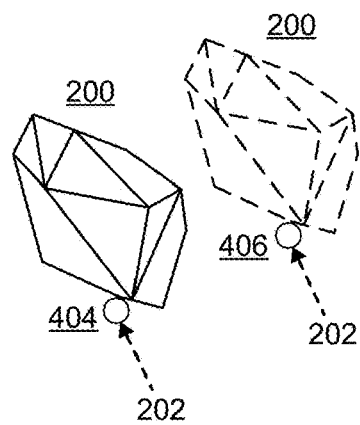

FIG. 4C depicts a user interaction with the two-dimensional representation 200 of the three-dimensional object 114 when the angle 302 between the object view vector 304 and the interaction plane 306 is a large angle. Initially, the user input 202 is in a first position 404 and the user attempts to move the two-dimensional representation 200 of the three-dimensional object 114 by moving the user input 202 to a second position 406. As shown in FIG. 4C, the two-dimensional representation 200 of the object moves as the user intends. The two-dimensional representation 200 of the object moves to an expected position because the angle 302 between the object view vector 304 and the interaction plane 306 is large, and the ray cast intersection information to determine user inputs is not limited.

Figure 4D:
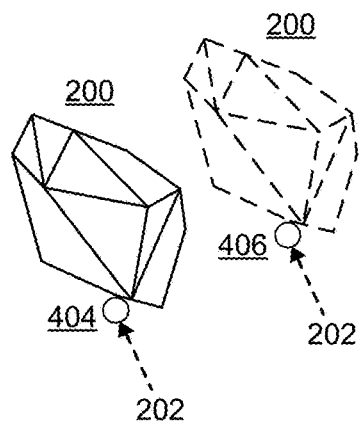

FIG. 4D depicts a user interaction with the two-dimensional representation 200 of the three-dimensional object 114 when the angle 302 between the object view vector 304 and the interaction plane 306 is small and the interaction plane 306 is rotated about the constant vector 312. Again, the user input is initially in the first position 404 and the user attempts to move the two-dimensional representation 200 of the three-dimensional object 114 by moving the user input 202 to the second position 406. As shown in FIG. 4D, the two-dimensional representation 200 of the object now moves as the user intends. The two-dimensional representation 200 of the object moves to the expected position because the interaction plane 306 is rotated about the constant vector 312 to correct the small angle 302 between the object view vector 304 and the interaction plane 306. In this manner, ray cast intersection information is increased and available to determine the user inputs.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-4.

Figure 5:
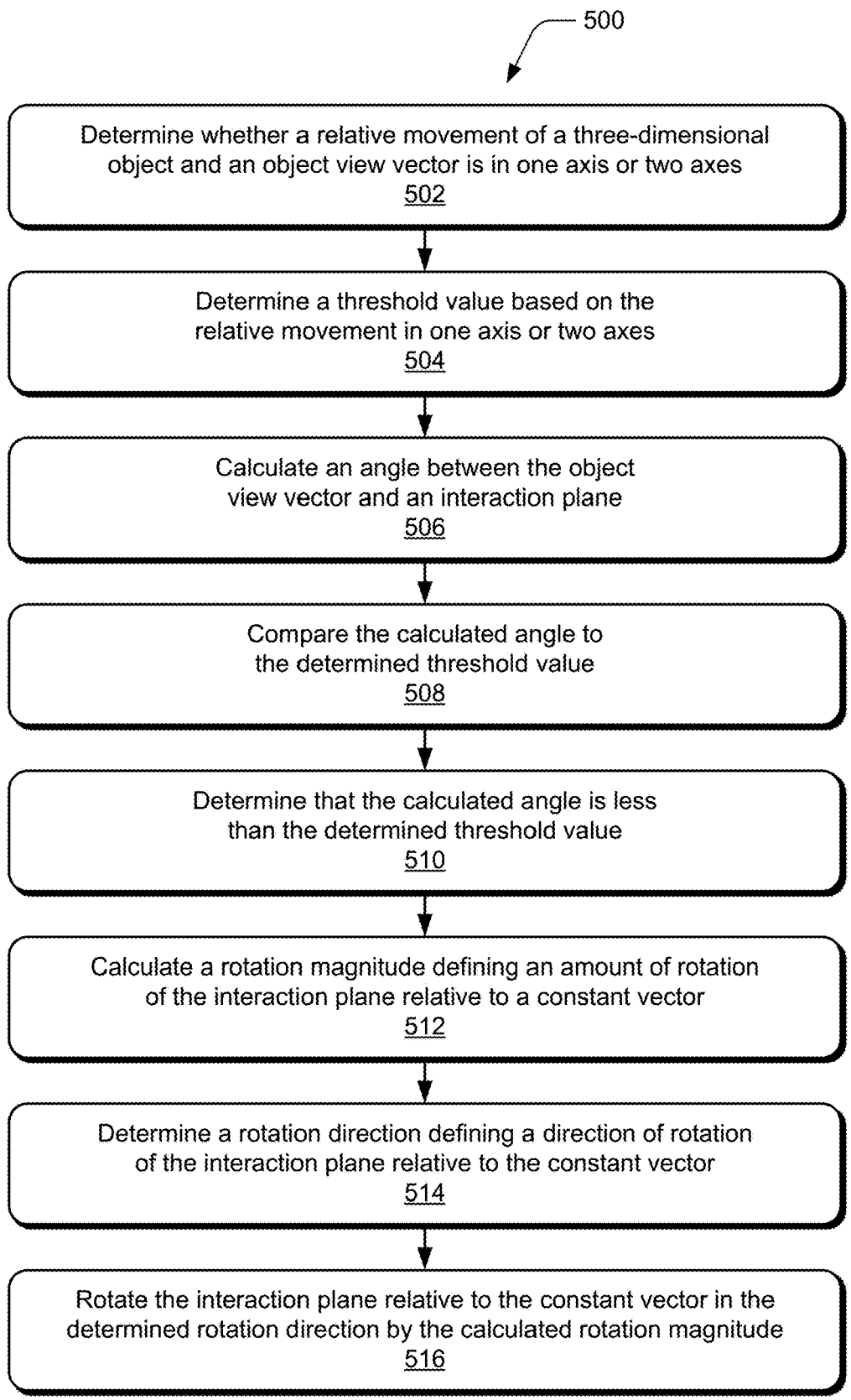
FIG. 5 is a flow diagram depicting a procedure in an example implementation in which an angle between an object view vector and an interaction plane is monitored, a determination is made that the angle between the object view vector and the interaction plane is below a threshold, and the interaction plane is rotated.

FIG. 5 is a flow diagram depicting a procedure 500 in an example implementation in which an angle between an object view vector and an interaction plane is monitored, a determination is made that the angle between the object view vector and the interaction plane is below a threshold, and the interaction plane is rotated.

The interface module 110 is implemented by the computing device 102 to process the three-dimensional object 112 and initiate rendering the two-dimensional representation 116 of the three-dimensional object 112 in the user interface 118 for display, such as by the display device 104. A user may interact with the two-dimensional representation 116 via a user input 202, such as with a cursor control device, gesture, spoken utterance, and so forth.

A determination is made as to whether a relative movement between a three-dimensional object 112 and an object view vector 304 is in one axis or two axes (at 502). For example, the interaction monitoring module 120 is implemented to determine whether a relative movement of the three-dimensional object 112 and the object view vector 304 is in one axis or two axes in the example environment.

A threshold value is determined by the interface module 110 based on whether the relative movement of the three-dimensional object 112 and the object view vector 304 is in one axis or two axes (at 504). For example, a first threshold value may be determined for a relative movement in one axis and a second threshold value may be determined for a relative movement in two axes. A threshold value for a relative movement in a one axis may be lower than a threshold value for a relative movement in two axes. This is because the limited ray cast intersection information is less challenging to overcome when the relative movement is in one axis than when the relative movement is in two axes.

An angle between the object view vector 304 and an interaction plane 306 is calculated by the interaction monitoring module 120 (at 506). The calculation of the angle between the object view vector 304 and the interaction plane 306 may be performed using a vector normal to the interaction plane 306. The calculated angle between the object view vector 304 and the interaction plane 306 is compared to the determined threshold by the interaction monitoring module 120 (at 508). A determination is made that the calculated angle between the object view vector 304 and the interaction plane 306 is less than the determined threshold value by the interaction monitoring module 120 (at 510).

A rotation magnitude is calculated defining an amount of rotation of the interaction plane 306 relative to a constant vector 312 by the interaction movement module 122 based on the calculated angle between the object view vector 304 and the interaction plane 306 being less than the threshold value (at 512). The rotation magnitude may be proportional to the calculated angle between the object view vector 304 and the interaction plane 306, and the magnitude may be calculated by mapping the calculated angle between the object view vector 304 and the interaction plane 306 to a magnitude range. For example, a calculated angle between the object view vector 304 and the interaction plane 306 may be in a range of 0.0 to 0.1 radians and the calculated angle between the object view vector 304 and the interaction plane 306 may be mapped to a magnitude in a range of 0.0 to $\pi/4$ radians to calculate the rotation magnitude.

A rotation direction is determined defining a direction of rotation of the interaction plane 306 relative to the constant vector 312 by the interaction movement module 122 (at 514). The rotation direction may be determined by calculating a dot product between the object view vector 304 and the constant vector 312.

The interaction plane 306 is rotated by the interaction movement module 122 relative to the constant vector 312 in the rotation direction by the rotation magnitude (at 516). The rotated interaction plane 306 may be used for ray intersection tests to determine a user's intention for a relative movement between the object view vector 304 and the three-dimensional object 112 which is reflected by the two-dimensional representation 116. In this manner, user manipulations of a three-dimensional object 112 in an example environment are in accordance with user inputs when the angle between an object view vector 304 and an interaction plane 306 is small. For example, the user's attempt to move the two-dimensional representation 116 of the three-dimensional object 112 by a relatively small amount may move the two-dimensional representation 116 by the relatively small amount. Also, the user's attempt to move the two-dimensional representation 116 of the three-dimensional object 112 by a relatively large amount may move the two-dimensional representation 116 by the relatively large amount. This example has been written in terms of relative movements between the object view vector 304 and the three-dimensional object 112; however, interaction plane 306 rotation as described herein is also useful for scaling of three-dimensional objects when an angle between an object view vector 304 and an interaction plane 306 is small.

Example System and Device

Figure 6:
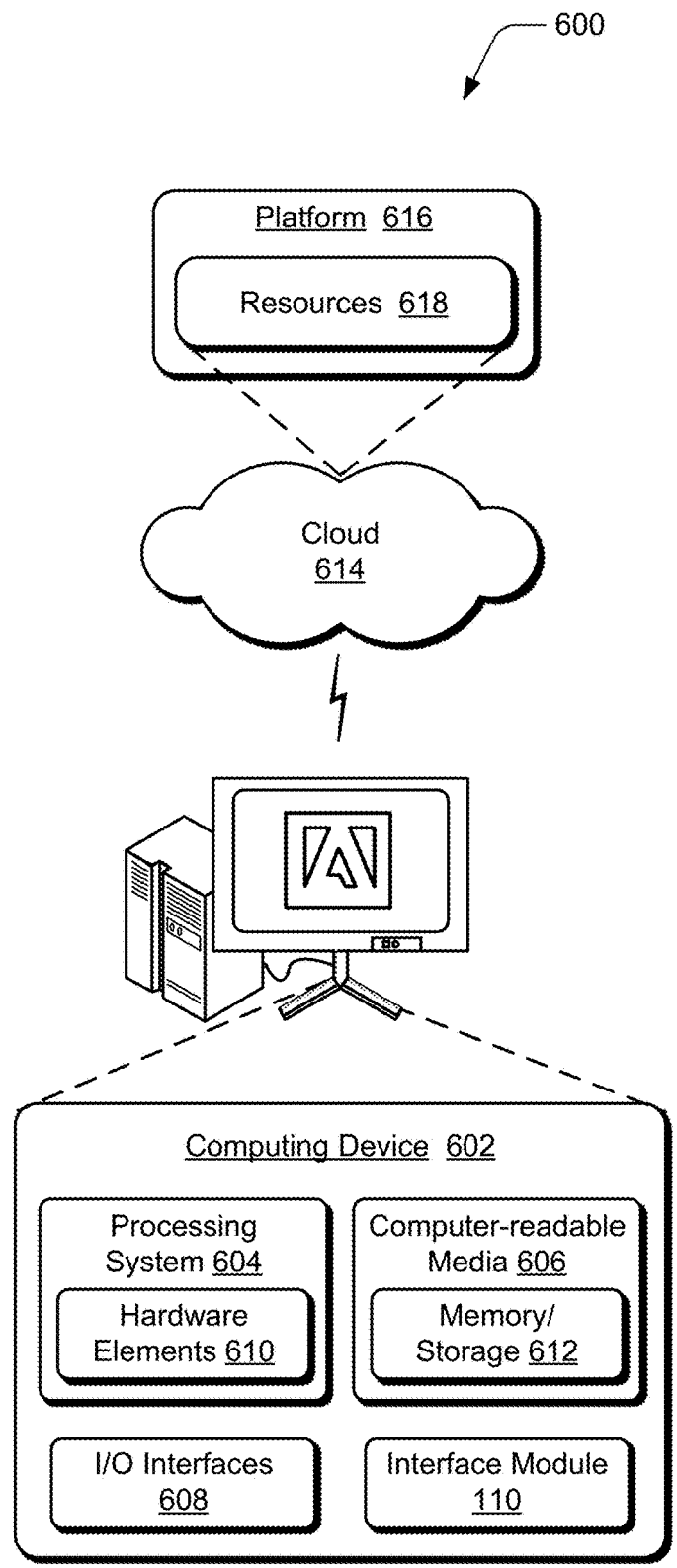
FIG. 6 illustrates an example system with an example computing device that is representative of one or more computing systems and/or devices that may implement the various techniques described herein.

FIG. 6 illustrates an example system generally at 600 that includes an example computing device 602, which is representative of one or more computing systems and/or devices that may implement the various techniques described herein. This is illustrated through inclusion of the interface module 110. The computing device 602 may be, for example, a server of a service provider, a device associated with a client (e.g., a client device), an on-chip system, and/or any other suitable computing device or computing system.

The example computing device 602 as illustrated includes a processing system 604, one or more computer-readable media 606, and one or more I/O interfaces 608 that are communicatively coupled, one to another. Although not shown, the computing device 602 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 604 is representative of functionality to perform one or more operations using hardware. Accordingly, the processing system 604 is illustrated as including hardware elements 610 that may be configured as processors, functional blocks, and so forth. This may include implementation in hardware as an application specific integrated circuit or other logic device formed using one or more semiconductors. The hardware elements 610 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 606 is illustrated as including memory/storage 612. The memory/storage 612 represents memory/storage capacity associated with one or more computer-readable media. The memory/storage component 612 may include volatile media (such as random access memory (RAM)) and/or nonvolatile media (such as read only memory (ROM), Flash memory, optical disks, magnetic disks, and so forth). The memory/storage component 612 may include fixed media (e.g., RAM, ROM, a fixed hard drive, and so on) as well as removable media (e.g., Flash memory, a removable hard drive, an optical disc, and so forth). The computer-readable media 506 may be configured in a variety of other ways as further described below.

Input/output interface(s) 608 are representative of functionality to allow a user to enter commands and information to computing device 602, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 602 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 602. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 610 and computer-readable media 606 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 610. The computing device 602 may be configured to implement particular instructions and/or functions corresponding to the software and/or hardware modules. Accordingly, implementation of a module that is executable by the computing device 602 as software may be achieved at least partially in hardware, e.g., through use of computer-readable storage media and/or hardware elements 510 of the processing system 604. The instructions and/or functions may be executable/operable by one or more articles of manufacture (for example, one or more computing devices 602 and/or processing systems 604) to implement techniques, modules, and examples described herein.

The techniques described herein may be supported by various configurations of the computing device 602 and are not limited to the specific examples of the techniques described herein. This functionality may also be implemented all or in part through use of a distributed system, such as over a "cloud" 614 via a platform 616 as described below.

The cloud 614 includes and/or is representative of a platform 616 for resources 618. The platform 616 abstracts underlying functionality of hardware (e.g., servers) and software resources of the cloud 614. The resources 618 may include applications and/or data that can be utilized while computer processing is executed on servers that are remote from the computing device 602. Resources 618 can also include services provided over the Internet and/or through a subscriber network, such as a cellular or Wi-Fi network.

The platform 616 may abstract resources and functions to connect the computing device 502 with other computing devices. The platform 616 may also serve to abstract scaling of resources to provide a corresponding level of scale to encountered demand for the resources 618 that are implemented via the platform 616. Accordingly, in an interconnected device embodiment, implementation of functionality described herein may be distributed throughout the system 600. For example, the functionality may be implemented in part on the computing device 602 as well as via the platform 616 that abstracts the functionality of the cloud 614.

CONCLUSION

Although the implementation of interaction plane rotation for manipulation of three-dimensional objects has been described in language specific to structural features and/or methods, it is to be understood that the appended claims are not necessarily limited to the specific features or methods described. Rather, the specific features and methods are disclosed as example implementations of interaction plane rotation for manipulation of three-dimensional objects, and other equivalent features and methods are intended to be within the scope of the appended claims. Further, various different examples are described and it is to be appreciated that each described example can be implemented independently or in connection with one or more other described examples.

What is claimed is:

1. In a digital environment representing a three-dimensional space, a three-dimensional object on an interaction plane is represented by a two-dimensional point of view defined by an object view vector, a method implemented by at least one computing device of the digital environment, the method comprising:
   calculating an angle between the interaction plane and the object view vector, the interaction plane projecting relative movements of the three-dimensional object from the two-dimensional point of view defined by the object view vector in the three-dimensional space;
   comparing the angle between the object view vector and the interaction plane to a threshold value;
   determining the angle between the object view vector and the interaction plane is less than the threshold value; and
   rotating the interaction plane relative to a constant vector based on the angle between the object view vector and the interaction plane being less than the threshold value.

2. The method of claim 1 wherein the threshold value is less than or equal to 0.1 radian.

3. The method of claim 1 further comprising:
   determining a rotation direction defining a direction of the rotation of the interaction plane relative to the constant vector, and wherein said rotating the interaction plane relative to the constant vector is in the rotation direction.

4. The method of claim 3 wherein the determining the rotation direction comprises calculating a dot product of the object view vector and the constant vector.

5. The method of claim 1 further comprising:
   calculating a rotation magnitude defining an amount of the rotation of the interaction plane relative to the constant vector based on the angle between the object view vector and the interaction plane being less than the threshold value, and wherein said rotating the interaction plane relative to the constant vector by the rotation magnitude.

6. The method of claim 5 wherein the rotation magnitude is proportional to the angle between the object view vector and the interaction plane.

7. The method of claim 1 wherein the projecting the relative movements of the three-dimensional object comprises one of:
   moving the three-dimensional object relative to the object view vector; or
   moving the object view vector relative to the three-dimensional object.

8. The method of claim 1 wherein the projecting relative movements of the three-dimensional object comprises scaling the three-dimensional object.

9. The method of claim 1 further comprising:
   determining whether a relative movement between the three-dimensional object and the object view vector is one of: in a single axis as a basis for updating the threshold value, or in two axes as a basis for updating the threshold value.

10. In a digital environment representing a three-dimensional space, a three-dimensional object on an interaction plane is represented by a two-dimensional point of view defined by an object view vector, a system comprising:
    an interaction monitoring module implemented at least partially in hardware of a computing device to:
        calculate an angle between the interaction plane and the object view vector, the interaction plane projecting relative movements of the three dimensional object from the two-dimensional point of view defined by the object view vector in the three-dimensional space;
        compare the angle between the object view vector and the interaction plane to a threshold value; and
        determine the angle between the object view vector and the interaction plane is less than the threshold value; and
    an interaction movement module implemented at least partially in the hardware of the computing device to rotate the interaction plane relative to a constant vector in a rotation direction by a rotation magnitude.

11. The system of claim 10 wherein the threshold value is less than or equal to 0.1 radian.

12. The system of claim 10 wherein the interaction movement module is configured to determine the rotation direction defining a direction of the rotation of the interaction plane relative to the constant vector based on a calculated a dot product of the object view vector and the constant vector.

13. The system of claim 10 wherein the interaction movement module is configured to calculate the rotation magnitude defining an amount of the rotation of the interaction plane relative to the constant vector based on the angle between the object view vector and the interaction plane being less than the threshold value, the rotation magnitude being proportional to the angle between the object view vector and the interaction plane.

14. The system of claim 10 wherein the interaction movement module is configured to one of move the three-dimensional object relative to the object view vector, or move the object view vector relative to the three-dimensional object.

15. The system of claim 10 wherein the interaction movement module is configured to scale the three-dimensional object.

16. The system of claim 10 wherein the interaction movement module is configured to determine whether a relative movement between the three-dimensional object and the object view vector is in a single axis or is in two axes.

17. One or more non-transitory computer-readable storage media comprising instructions stored thereon that, responsive to execution by a computing device in a digital environment representing a three-dimensional space, cause operations of the computing device including:

representing a three-dimensional object on an interaction plane by a two-dimensional point of view defined by an object view vector;

calculating an angle between the interaction plane and the object view vector, the interaction plane projecting relative movements of the three dimensional object from the two-dimensional point of view defined by the object view vector in the three-dimensional space;

comparing the angle between the object view vector and the interaction plane to a threshold value;

determining the angle between the object view vector and the interaction plane is less than the threshold value; and rotating the interaction plane relative to a constant vector in a rotation direction by a rotation magnitude.

18. One or more non-transitory computer-readable storage media of claim 17 wherein the threshold value is less than or equal to 0.1 radian.

19. One or more non-transitory computer-readable storage media of claim 17 wherein the operations of the computing device further including:

calculating the rotation magnitude defining an amount of the rotation of the interaction plane relative to the constant vector based on the angle between the object view vector and the interaction plane being less than the threshold value.

20. One or more non-transitory computer-readable storage media of claim 17 wherein the operations of the computing device further including:

determining the rotation direction defining a direction of the rotation of the interaction plane relative to the constant vector.

* * * * *